Feb. 12, 1946.        H. V. FRIEDMAN        2,394,605
DRYING APPARATUS
Filed June 20, 1944
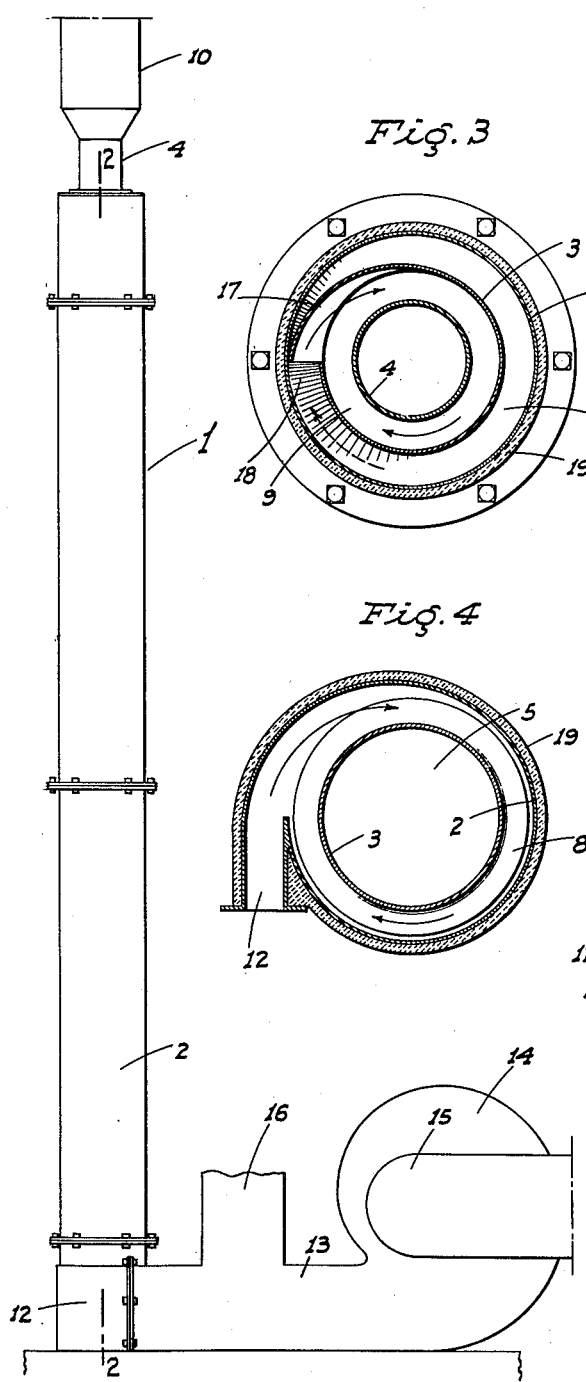
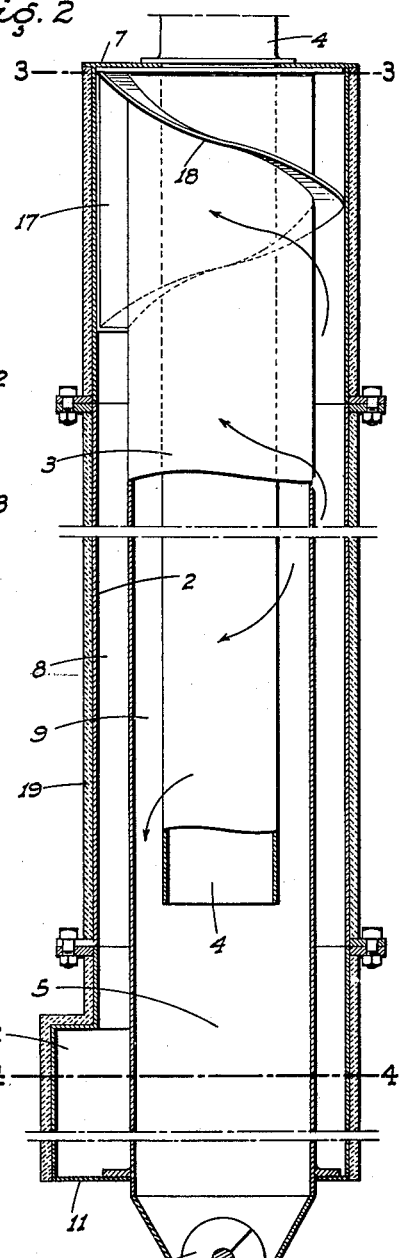
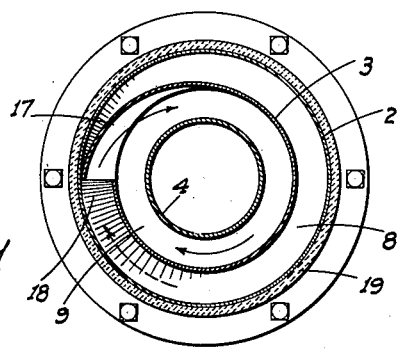
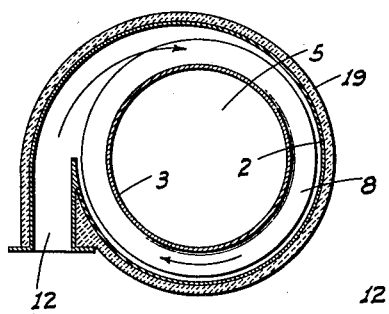
INVENTOR
Harold V. Friedman
BY Webster & Webster
ATTORNEYS Patented Feb. 12, 1946

2,394,605

UNITED STATES PATENT OFFICE 2,394,605

DRYING APPARATUS

Harold V. Friedman, San Francisco, Calif.

Application June 20, 1944, Serial No. 541,152

3 Claims. (Cl. 34—57)

This invention relates to improved commercial drying apparatus, especially for foods; and in particular the invention is directed to, and it is an object to provide, a novel drying tower for the effective dehydration of light weight, relatively small size materials in the form, for example, of powders, flakes, leaves, or the like.

A further object of this invention is to provide a material drying tower wherein heated air or gas in large volume comprises the drying medium; such heated air or gas, which carries the material to be dried, being force fed through a relatively long, circuitous path in the tower whereby the substantial length and time of travel assures maximum heat exchange and consequent drying of the entrained material.

An additional object of the invention is to provide a material drying tower, as above, which comprises a plurality of vertical, tubular columns mounted in telescoped relation; such columns being concentrically spaced from one another to provide passages therebetween which communicate at certain ends to form the circuitous flow path in the tower. The heated air or gas is fed into each of said passages in such manner as to traverse a spiral course therein, which is advantageous in that a substantial increase in the total length of the flow path is thus obtained.

Another object of the invention is to provide a drying tower which is sufficiently efficient in operation to be used for the redehydration of material previously dried by conventional processes, whereby to reduce the moisture content to a minimum. For example, spray dried eggs in the resulting powdered form can be further materially dehydrated in the drying tower herein shown and described.

A further object of the invention is to provide a simple, effective, and compact drying apparatus, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is an elevation of the drying tower and related apparatus.

Figure 2 is an enlarged sectional elevation, foreshortened, on line 2—2 of Fig. 1.

Figure 3 is a cross section on line 3—3 of Fig. 2.

Figure 4 is a cross section on line 4—4 of Fig. 2.

Referring now more particularly to the characters of reference on the drawing, the drying tower, which is indicated generally at 1, comprises an outer, vertically elongated tubular column 2 which surrounds an intermediate tubular column 3 in spaced relation; the column 3 being full length relative to the column 2. The intermediate column 3 surrounds an inner tubular column 4 in spaced relation, and said inner column depends from the upper end of the tower downwardly to a termination some distance above the lower end of intermediate column 3, whereby to form a separating chamber 5 in column 3 at its lower end; said separating chamber communicating at the bottom with an enclosed carry-off conveyor 6. An annular upper end wall 7 closes the adjacent ends of the passages 8 and 9 formed between the outer and intermediate columns, and the intermediate and inner columns, respectively. The inner column 4 projects upwardly through the upper end wall 7 to communication with an enlarged outlet conduit 10. The passage 8 is closed at the lower end of the tower by an annular bottom end wall 11.

The passages 8 and 9 are annular and vertically elongated, as shown, and are of limited radial extent or width; the width of said passages being approximately equal. At the lower end of the tower 1 the same is provided with a tangential feed or intake fitting 12 which communicates symmetrically with the lower end of the passage 8. Exteriorly of the tower the fitting 12 is connected with a relatively large-diameter feed conduit 13 which extends from the output of a high capacity blower 14, to which heated air is supplied by means of a conduit 15. The powdered or finely comminuted material which is to be dried is force-fed through a conduit 16 into the feed conduit 13 intermediate the intake fitting 12 and the blower 14. The material feeding means may be conventional and is not shown.

The material as fed into conduit 13 is immediately entrained in the large volume stream of heated air being forced through conduit 13 by the blower. From the conduit 13 such stream of heated air is fed into the lower end of passage 8 tangentially by the fitting 12. This tangential feeding into passage 8 causes the stream of heated air to traverse a spiral course in said passage from its lower end upwardly to adjacent the upper end of the same. At the upper end of passage 8 the same is connected with the upper end of the passage 9 by a tangential transfer conduit 17 of substantial height. In order to prevent any undesirable pocketing of the stream in the upper end of passage 8, and to assure movement of such stream through the transfer conduit 17, a spiral or helical baffle 18 is fitted in passage 8 and leads from the lower end to the upper end of said conduit; said baffle being of one full turn, as shown.

From the tangential transfer conduit 17 the stream of heated air and entrained material enters the upper end of passage 9, and due to such tangential entry begins a downwardly spiraling movement in said passage, which continues to its lower end.

From the lower end of passage 9 the stream flows into chamber 5, wherein the material, which has now been dried, gravitationally separates from the air; the material falling into the carry-off conveyor 6, while the air escapes upwardly through the inner tubular column 4 into the enlarged outlet conduit 10. If desired, the air from conduit 10 can be passed through a demoisturizing unit and returned to the heating unit (not shown) which supplies hot air through conduit 15 to the blower 14. In this manner a closed circuit can be employed.

In order to prevent heat escape from the drying tower it is provided with an exterior layer of insulating material, which layer is indicated generally at 19. It should also be noted that due to the telescopic construction of the unit the passage 8, together with the intermediate column 3, provides an insulating effect for the passage 9.

The above described drying tower is extremely efficient for the reason that the path of movement of the stream of heated air and entrained material to be dried is relatively long and circuitous, which affords ample time for maximum heat exchange between the heated air and material, with resultant drying or dehydration of the latter. In other words, there is sufficient time for the material to be raised to and maintained at a high enough temperature to produce reduction of moisture content in the material to a very low percentage.

Another advantage of the invention is that the drying operation can be practiced as a continuous process.

Although hot air has been described as the drying medium, certain inert gases, or a combination of gases, may be used, particularly if the outlet 10 is connected in closed or return-circuit relation to the blower 14.

From the foregoing description it will be readily seen that I have produced such an apparatus as substantially fulfills the objects of the invention as set forth herein.

While this specification sets forth in detail the present and preferred construction of the apparatus, still in practice such deviations from such detail may be resorted to as do not form a departure from the spirit of the invention, as defined by the appended claims.

Having thus described my invention, what I claim as new and useful and desire to secure by Letters Patent is:

1. A drying apparatus comprising three elongated tubular columns of different diameters arranged in concentric spaced relation, the outer and intermediate columns being joined together at their lower ends, a conduit leading tangentially into the space between the outer and intermediate columns at the bottom thereof, means to feed a heated, gaseous medium with entrained material therein through said conduit and at high velocity into said space whereby to cause the gaseous medium and material to spiral upwardly through said space from the bottom to adjacent the top of said two columns, means to then divert the gaseous medium and material from the upper end of said space into the space between the intermediate and the inner columns, the inner column terminating at its lower end short of the bottom of the intermediate column and projecting outside of said intermediate column at its upper end whereby to allow the entrained material to drop by gravity to the bottom of the intermediate column while allowing the gaseous medium to pass from the apparatus through the inner column, and means to withdraw material from the bottom of the intermediate column.

2. A device as in claim 1 in which the diverting means between the upper ends of the outer and intermediate columns comprises a vertical conduit of some length leading from the space between the vertical walls of the outer and intermediate columns tangentially into the space between the intermediate and inner columns.

3. A device as in claim 1 in which the diverting means between the upper ends of the outer and intermediate columns comprises a vertical conduit of some length leading from the space between the vertical walls of the outer and intermediate columns tangentially into the space between the intermediate and inner columns, and a spiral baffle plate interposed between the walls of the outer and intermediate columns and having its point of commencement adjacent the lower end and to the back of said vertical conduit and its termination adjacent the upper end and to the front of such conduit whereby to positively divert the gaseous medium and entrained material into the said vertical conduit.

HAROLD V. FRIEDMAN.